United States Patent [19]

Stribbell et al.

[11] Patent Number: 5,395,575
[45] Date of Patent: Mar. 7, 1995

[54] ROTARY REFORMING OF THERMOPLASTICS EXTRUDATE

[75] Inventors: Bruce J. Stribbell, Rochester; Donald L. Franck, Warren, both of Mich.

[73] Assignee: General Motors Corporation, Detroit, Mich.

[21] Appl. No.: 116,834

[22] Filed: Sep. 7, 1993

[51] Int. Cl.6 .................. B29C 43/08; B29C 43/40
[52] U.S. Cl. .................. 264/151; 264/161; 264/177.19; 264/177.20; 264/210.2; 264/178 R; 264/237; 425/327; 425/363; 425/367
[58] Field of Search .............. 264/177.17, 177.19, 264/177.10, 177.20, 151, 148, 161, 178 R, 237, 210.2; 425/327, 325, 142, 363, 367, 374; 156/244.11, 244.24

[56] References Cited

U.S. PATENT DOCUMENTS

| | | | |
|---|---|---|---|
| 2,728,104 | 12/1955 | Fisch | 264/177.17 |
| 3,825,393 | 7/1974 | Bittner et al. | 425/363 |
| 3,886,250 | 5/1975 | Danko | 264/210.2 |
| 4,323,533 | 4/1982 | Bramhall | 264/148 |
| 4,425,289 | 1/1984 | Lee et al. | 264/40.7 |
| 4,849,045 | 7/1989 | Schmidt | 156/244.24 |
| 5,114,650 | 5/1992 | Franck et al. | 264/151 |
| 5,171,499 | 12/1992 | Cehelnik et al. | 264/151 |
| 5,226,998 | 7/1993 | Few | 264/177.17 |
| 5,252,283 | 10/1993 | Wenzel et al. | 264/177.20 |

FOREIGN PATENT DOCUMENTS

| | | | |
|---|---|---|---|
| 2203881 | 8/1973 | Germany | 425/327 |
| 59-109312 | 6/1984 | Japan | 425/363 |

Primary Examiner—Jeffery R. Thurlow
Attorney, Agent, or Firm—George A. Grove

[57] ABSTRACT

Production line and method for manufacturing strips of foil stabilized plastics moldings featuring a rotary reform machine that has a pair of reform wheels that are rotatably driven to profile the extrudate while matching the output speed of extrudate exiting from the extrusion die of a plastics extruder. The wheels have equal diameters and are motor driven at the same angular velocity so that forming dies in the wheels synchronize and cooperate to pressure mold spaced sections of the extrudate feeding therethrough to form high quality end corners with an offal section therebetween. A haul-off pulls the strip from the extruder die, the rotary reform machine, a water trough and flash trimmer and into a cutter where the offal is removed. The strip is maintained under a predetermined tension load by use of an adjustable friction brake on the stabilizer foil so that the heated plastics exiting the extruder will be uniform in initial profile, providing high quality extrudate feeding into the reforming wheels.

14 Claims, 6 Drawing Sheets

ROTARY REFORMING OF THERMOPLASTICS EXTRUDATE

FIELD OF THE INVENTION

This invention relates to the forming of plastics molding strips and other products from heated polymeric materials, and more particularly to new and improved machines and methods utilizing rotary form wheels for reforming plastics extrudate at line speed as delivered from a plastics extruder.

DESCRIPTION OF RELATED ART

Profiled strips of extruded polymeric materials have been widely used in automobiles, appliances and fixtures as molding pieces to provide protection and a finely finished appearance to such units. In automotive applications, the appearance of extruded strips, such as used for body side moldings for front and rear quarter panels and the side doors, must meet exceptionally high standards for color uniformity and match as well as for distinctive end shapes for widespread consumer approval and acceptance. Of particular importance is the optimized cornering of the ends of file strips so that they present clearly defined angles with respect to the show surface and without any appreciable distortion of the strip.

Prior to the present invention, various devices and procedures have been employed to meet such standards. Examples of such are disclosed in U.S. Pat. No. 5,114,650 to D. F. Franck et al, issued May 19, 1992, entitled "Extrusion Shaping Method", assigned to the assignee of this invention and hereby incorporated by reference. In the cited prior art patent, two sets of matched dies mounted on die carriers, in turn mounted on extensible shuttles, are synchronized to alternately work in a "hand over hand" manner to form molding parts from a linearly moving strip of hot plastics extrudate of PVC, or other thermoplastic material, generated by an extruder at a set line speed to produce high quality moldings.

While such devices and procedures are acceptable, reciprocating motion is required with one shuttle being moved in one direction without performing work as the other moves in an opposite direction while forming molding parts. The shuttle also requires precise linear movement alignment with the extrudate to produce acceptable finishing moldings without shock line defects and dimensional variations. For high quality moldings, the effective speed of the linear movable die arrangement is limited and cannot match the output of high volume extruders without compromising molding quality.

Additionally, since different batches of base material may vary in quality, such as in compound constituents, color and metallization, the prior art devices and methods did not lend themselves to the production of matched sets of moldings of varying lengths, such as required for vehicle body moldings having identical color or metallization to be fastened in alignment on the front and rear quarter panels and the door or doors therebetween.

SUMMARY OF THE INVENTION

The present invention is drawn to machinery and methods for reforming and enhancing the shape of an extruded polymer strip utilizing rotary form wheels for reforming extrudate and having insert forming dies in the wheels synchronized to compression mold such strips with styling enhancements and precisely shaped ends before cooling to eliminate post end forming, post functional or post styling enhancements.

With this invention, rotary forming wheels are driven at selected angular velocities to smoothly match the output speeds of a wide range of extruders and without transmittal of pulse energy into extrudate being profiled by the wheels so that line shocks and resulting extrudate defects are eliminated.

This invention further provides a new and improved method and mechanism using synchronized insert dies in a pair of rotary forming wheels for profiling and end forming heated extrudate over a wide range of line speeds by matching the speed of the forming wheels with the output of the extruder.

In the preferred embodiment, circular forming wheels with peripheral forming surfaces and with strip end forming dies therein are rotatably mounted on supporting structure and are rotatably driven so that the dies cooperate with each other at a selected station such as when the wheels are closest to tangency to produce quality moldings with precisioned formed profiles and end configurations. This invention further features tensioning of stabilizing foil fed into the extrudate to augment the dimensional uniformity and profile of the extrudate as it is extruded from an extruder.

This invention additionally features a reform machine with a pair of mating forming wheels which can be operated at varying speeds to match the output of a wide range of plastics extruders including those having high flow rates, such as those having flow rates greater than 50 ft/min., to profile extrudate and thereby form high quality moldings. Furthermore, with this invention, straightforward and simplified insert dies are provided in the forming wheels for end forming the profiled extrudate at high speed and while the extrudate is being produced by the extruder.

With this invention, molding or section length can be varied by simply replacing the wheels with synchronized dies with others having smaller or larger diameters. By selecting forming wheels with appropriate profiles and using them on the reform machine, an ability to make moldings with different tapers such as single, double and compound tapers is provided. With the rotary motion of the reforming machine of this invention, there are no appreciable energy pulses inputing the extrudate so that impact or shock marks on the moldings are effectively eliminated. In this invention, there is improved cooling of the extrudate before, during and after forming so that better strip profiles and end shapes are produced.

These and other features, object and advantages of the present invention will become more apparent from the following detailed description and drawings in which:

DETAILED DESCRIPTION OF THE PREFERRED EMBODIMENTS

Figures 1, 4:
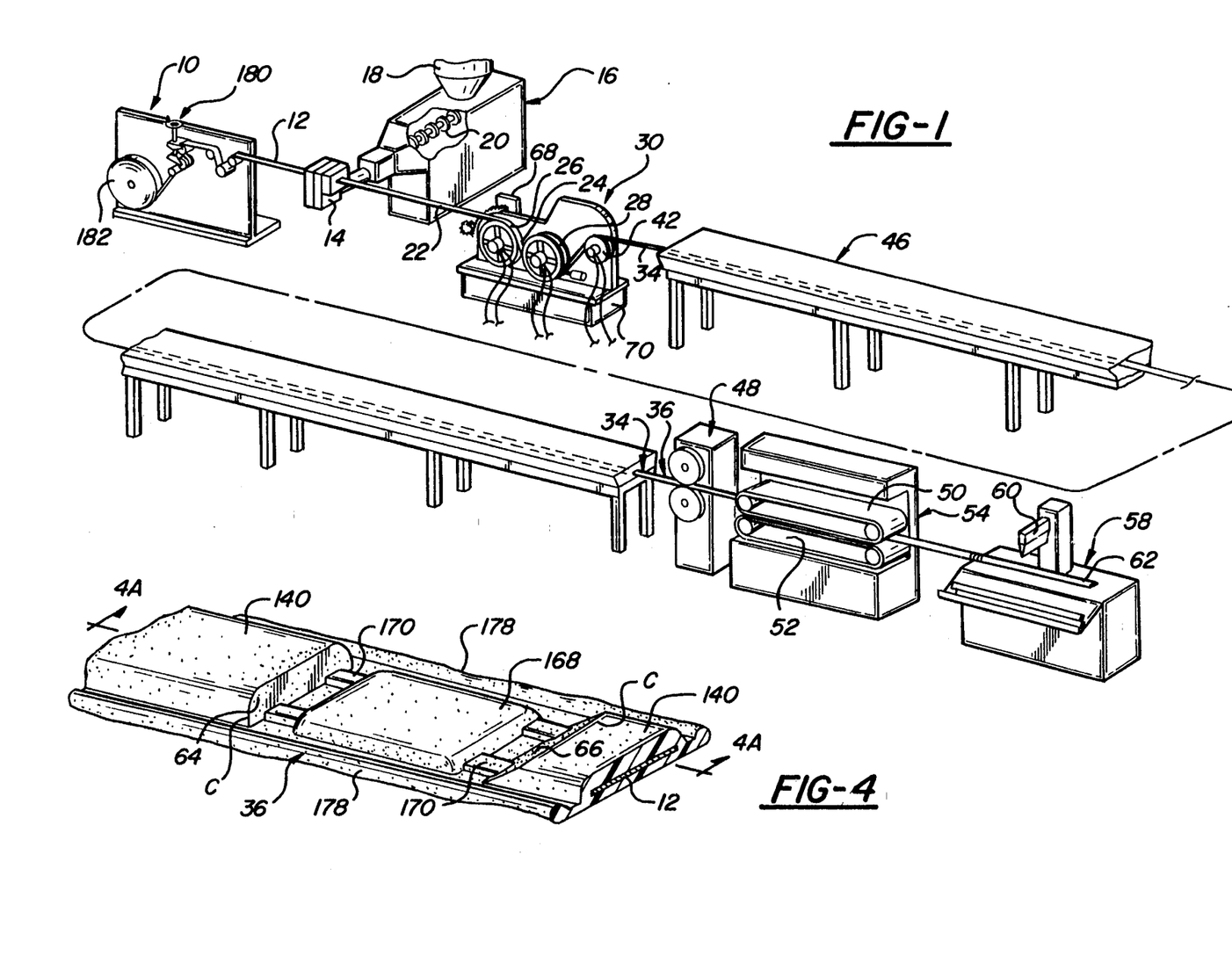
FIG. 1 is a pictorial view of tooling for producing strips of plastics moldings.
FIG. 4 is a pictorial view of a strip of reformed polymer made according to one preferred embodiment of the present invention.

Turning now to the drawings, FIG. 1 pictorially illustrates a stabilizer foil supply station 10 supplying a thin ribbon of stabilizer foil 12 of aluminum, or other material, through an extrusion die 14 of a plastics extruder 16. The extruder 16 has a hopper 18 into which a supply of pelletized PVC or other polymeric material is fed.

The extruder has a conventional plasticating screw 20 rotatably driven to force pulses of polymer melt to exit extrusion die 14 as an elongated extruded strip or band 22 of hot polymer with the thin ribbon of stabilizer foil 12 forming a longitudinal core therefor.

The strip 22 is routed through the plastics reform interface or "apex" 24 of a pair of relatively adjustable forming wheels 26, 28 of a rotary strip reforming machine 30. Before entering the reform interface, the strip is precooled by coolant circulating through coolant passages in wheel 26 so that it has a sufficiently high viscosity for profiling and end forming by the wheels.

The strip, after leaving the interface or apex 24 with additional cooling provided by coolant circulating in wheel 28 exits the reforming wheels 26, 28 as a reformed strip 34 having a reformed profile and having longitudinally extending and laterally spaced edges formed as offal 36. This offal is pressure formed by the wheels and the synchronized forming dies 38, 40 each operatively mounted in an arcuate section of the reform wheels 26, 28. As the reformed strip turns off of the reform wheel 28, it is routed upwardly and over an idler wheel 42 which is operatively mounted at various selected positions on a support plate 44 of the rotary reform machine 30. In addition to providing structure to change strip routing paths, the idler also provides progressive cooling of the strip by coolant circulating through the wheel 42 as in the reforming wheels.

On leaving the idler wheel, the reformed strip 34 is then passed through cooling water in trough 46, which further cools the reform strip for stripping by a powered trim machine 48. From the trim machine the strip feeds through the powered upper and lower endless friction belts 50, 52 of a haul-off 54 which frictionally engage the strip and are operative to place the strip in tension and pull the strip from the extruder die, through the rotary reforming machine, the water trough and the trimmer machine 48. The machine 48 finishes the bottom of the strip and trims away any flash resulting from the profiling action of the reform wheels and the forming dies on the strip during reforming.

The trimmed strip is moved by the haul-off 54 into the cutter station 58, which has a movable knife 60 or other cutting device to cut the offal from the strip 34 so that finished strips of molding 62 of predetermined length are produced. These finished moldings as profiled by the form wheels 26, 28 have ends 64, 66 with corners "C" of predetermined radii to meet high standards for profile uniformity and corner appearance.

Figures 2, 2A:
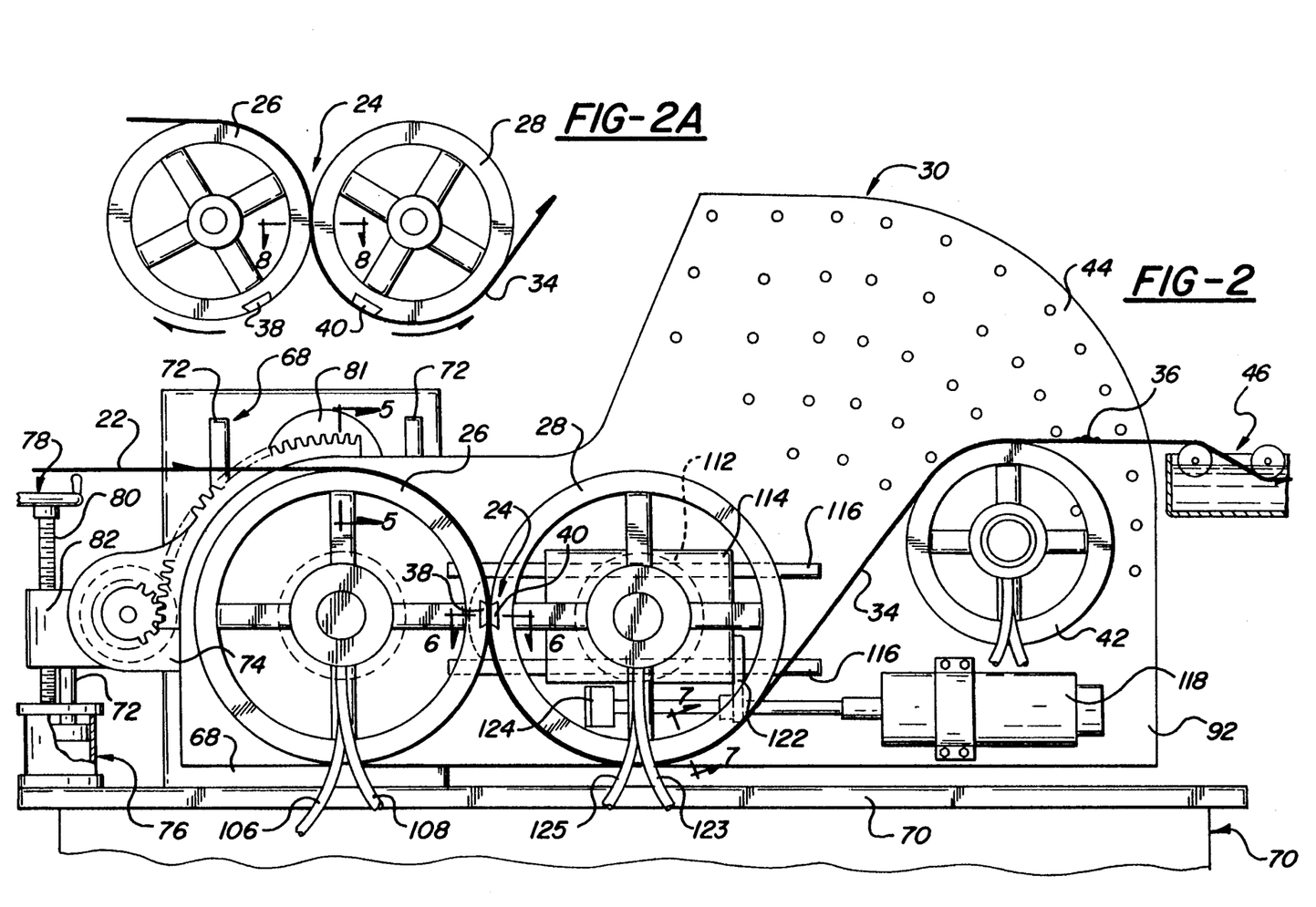
FIG. 2 is a side elevation view of a rotary reforming machine forming part of the tooling of FIG. 1.
FIG. 2A is a side view diagrammatically showing the pair of rotary forming wheels of the machine of FIG. 2 but rotated from their FIG. 2 position.
Figure 3:
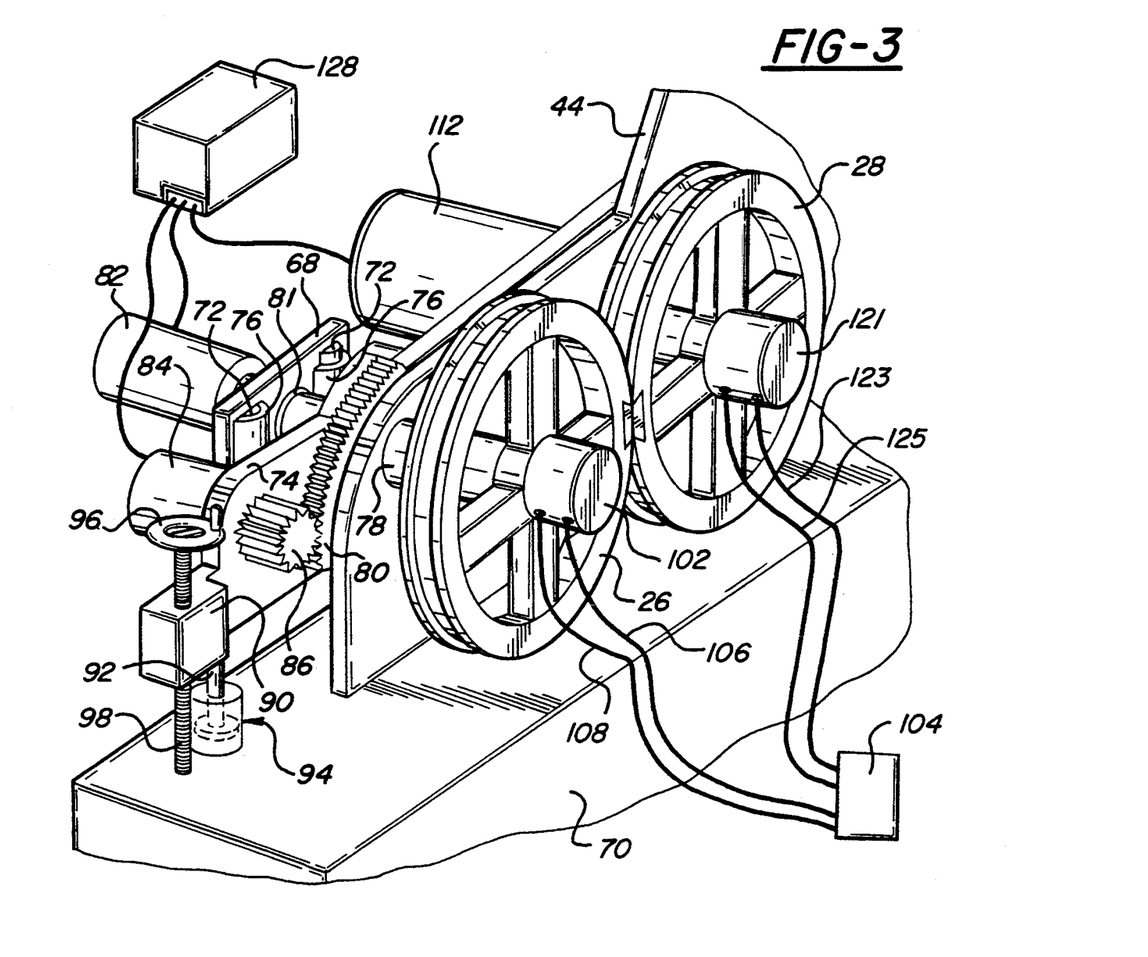
FIG. 3 is a pictorial view of a portion of the rotary reform machine of FIG. 2.

Turning now in greater detail to FIGS. 2 and 3, there is shown an upright 68 secured at its lower end to the horizontal base 70. The upright has vertical tracks 72 which mounts a carrier plate 74 that has slides 76 fixed to the back side thereof that are slidably retained on the tracks 72 so that the carrier plate can be adjusted vertically to move the reform machine 30 mounted thereto relative to the base 70.

The carrier plate 74 has a large diameter bearing 78 fixed thereto which transversely extends therefrom in one direction to rotatably support a large diameter sector gear 80 and the support plate 44 of the rotary reform machine which is secured to the sector gear. The bearing 78 also extends in an opposite direction through a vertical adjustment slot 81 in the upright 68 and mounts a motor 82 on the outboard end thereof. The motor 82 has an output shaft, not illustrated, which extends through the bearing 78 and is operatively connected to the form wheel 26 for the rotatable drive thereof.

Figure 11:
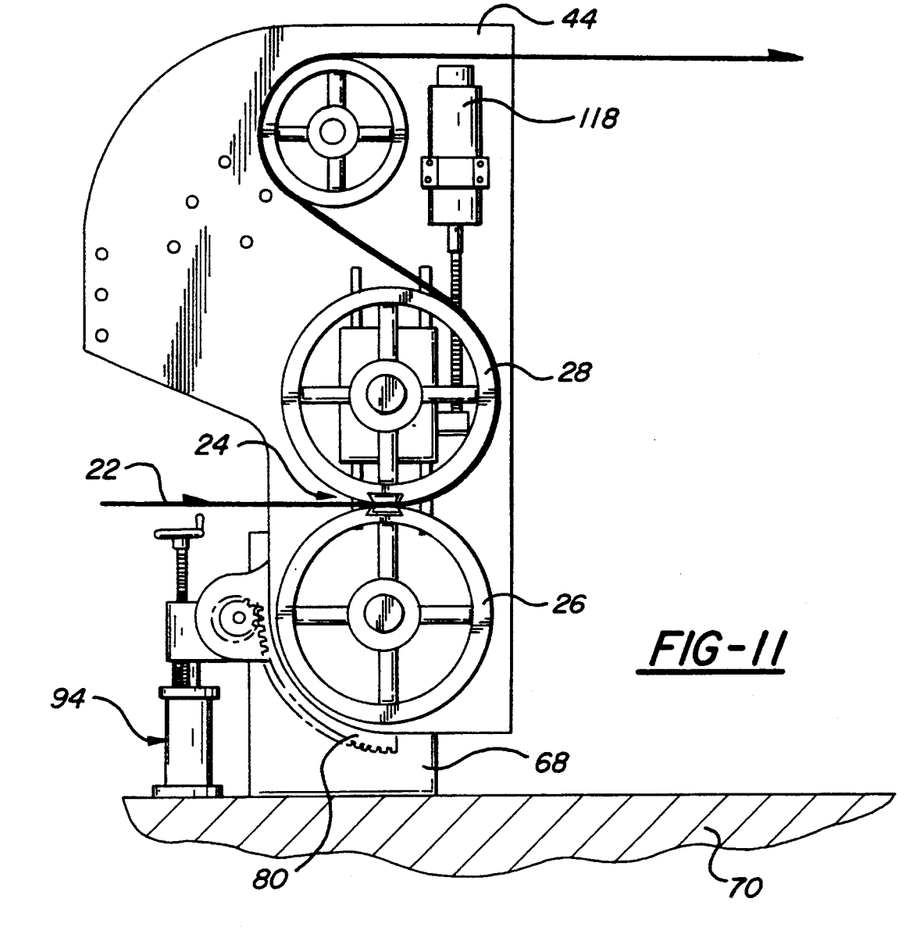
FIG. 11 is a side elevational view of the rotary reforming machine moved from the FIG. 2 position to a vertical position.

Fixed to the back side of the carrier plate 74 is another motor 84 that has a drive shaft journaled in the plate 74 and extends therethrough and terminates in a spur gear 86 whose teeth mesh with the teeth of the sector gear 80 so that the motor 84 can be energized to turn the sector gear and move the rotary reform machine from the horizontal position of FIGS. 2 and 3 to the vertical position in FIG. 11 to vary the time the strip is on the cooling segment of forming wheel 26 and thereby the viscosity of the strip before being reformed at the working interface of the reform wheels.

The carrier plate has an extension 90 which receives the outboard end of a piston rod 92 of a power cylinder 94 mounted on base 70. A piston operatively mounted within the power cylinder and connected to the piston rod is vertically movable on control of hydraulic fluid to and from the cylinder. The force of fluid pressure moves the piston upwardly and the plate 74 fixed thereto by the piston rod. The extension 90 additionally mounts a hand wheel 96 provided with a shaft 98 that threads through the extension and is adjusted by rotation of the hand wheel so that its distal end engages the top of the cylinder or the base 70 to lock the support plate in adjusted position.

A stationary coolant distribution hub 102 is operatively mounted on the outboard end of the drive shaft of form wheel 26 to circulate liquid coolant through the coolant passage 110 in forming wheel 26 for cooling the profiled strip 22 extruded from extruder 16. The coolant is pumped into the form wheel hub 102 from coolant source 104 through line 106 and is returned through line 108 after circulation through the coolant passage 110 in the wheel 26.

The second forming wheel 28 has a diameter equal to that of the first forming wheel 26 and is rotatably driven at the same speed as the first forming wheel by a second motor 112 located at the back side of the forming machine on the end of a large diameter bearing secured to a carriage 114. This carriage is longitudinally adjustably mounted on rails 116 secured to support plate 44. A reversible adjustment motor 118 secured to support plate 44 rotatably drives an elongated output shaft 120, which threads through connector plate 122 and has its outer end supported in journal 124. The plate 122 is attached to carriage 114 so that clockwise rotation of motor 118 will move carriage 114 and forming wheel 28 mounted thereon by the bearing toward forming wheel 26 and into a forming position, such as shown in FIG. 2. Counterclockwise rotation of shaft 120 will retract wheel 28 from wheel 26 for changing dies 38, 40 in wheels 26, 28, servicing the machine 30 and for replacing forming wheels 26, 28 for wheels of different sizes or for wheels having different male and female profiles.

As with wheel 26, the wheel 28 has a stationary coolant distribution hub 121 operatively mounted on the end of its drive shaft and distributes coolant into the cooling circuit or passage 119 within the wheel for cooling the profiled strip as it leaves the profiling interface of the forming wheels 26 and 28. Cooling fluid is pumped into the wheel 28 through line 123 from source 104 and returned through line 125. It will be seen that the underside of the strip contacts wheel 26 for cooling while the profiled show face contacts wheel 28 for cooling.

The idler wheel 42 has cooling provision like that of the forming wheel so that the profiled strip is progressively cooled by the wheel cooling system during operation. The idler wheel position can be readily changed to increase or decrease the cooling of the profiled strip.

Motors 82 and 112 have their output speeds regulated and controlled by an electronic controller 128 so that the insert dies 38, 40 mounted in the forming wheels are synchronized to precisely mate at the tangent position, shown in FIG. 2, to effect the end forming of the strip 22 as it passes through the interface of the two forming wheels 26 and 28.

Figure 6:
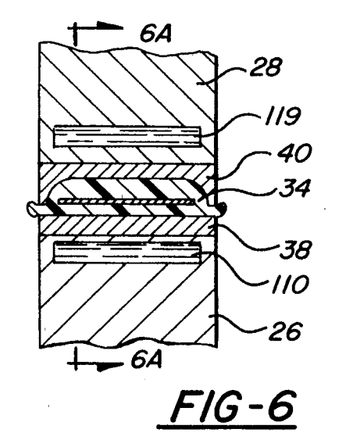
FIG. 6 is a cross-sectional view taken along sight lines 6—6 of FIG. 2.
Figure 6A:
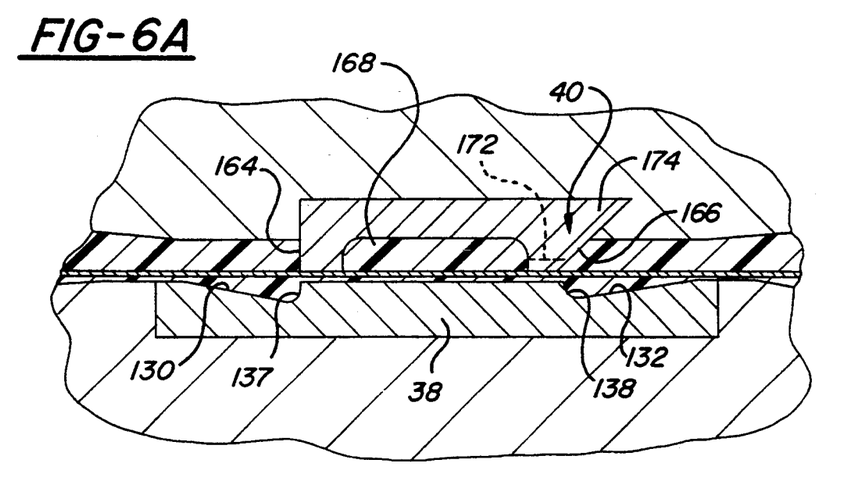
FIG. 6A is a cross-sectional view taken along sight lines 6A—6A of FIG. 6.
Figure 7:
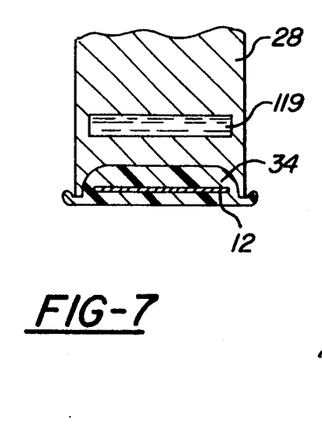
FIG. 7 is a cross-sectional view taken along sight lines 7—7 of FIG. 2.
Figure 8:
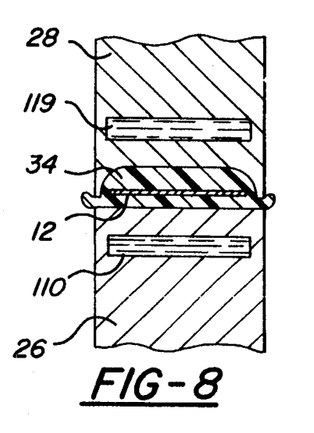
FIG. 8 is a cross-sectional view taken along sight lines 8—8 of FIG. 2A.
Figure 10:
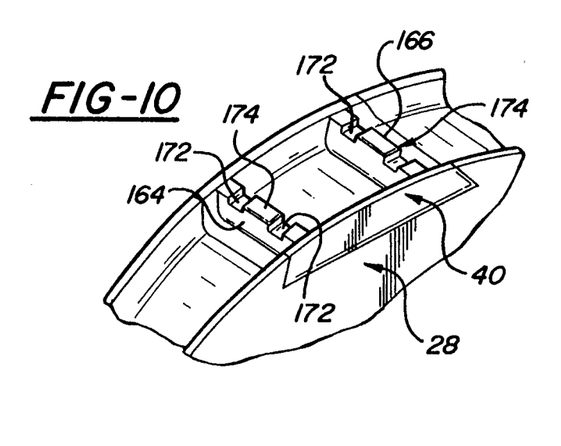
FIG. 10 is a pictorial view of a portion of another of the forming wheels of the machine of FIG. 2.

The forming dies 38, 40, best shown in FIGS. 6, 6A and 10, are removably mounted in the periphery of the forming wheels and have male and female forming surfaces shaped to end form the extrudate with offal section 36 therebetween as the extrudate passes through the interface of the forming wheels and when the forming dies are in coincidence.

Figure 4A:
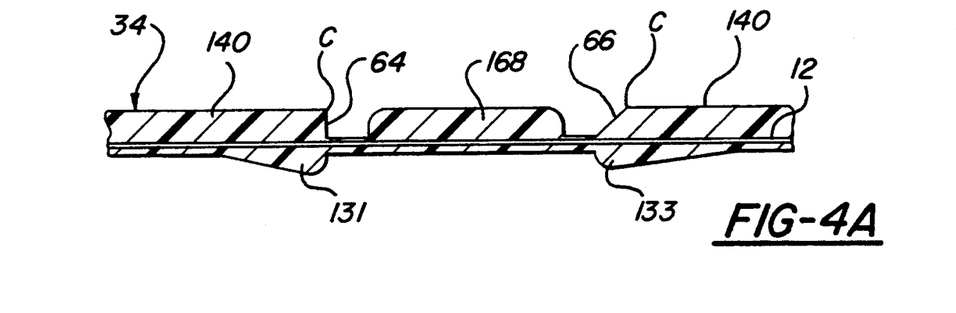
FIG. 4A is a sectional view taken along longitudinal sight lines 4A—4A of FIG. 4.
Figure 5:
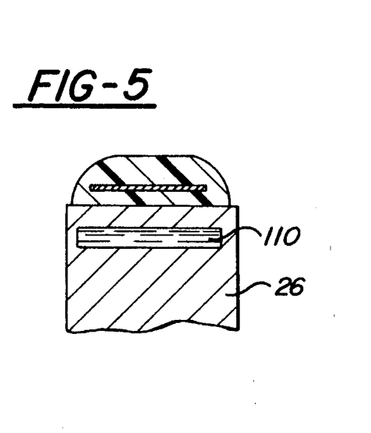
FIG. 5 is a cross-sectional view of a forming wheel taken along sight lines 5—5 of FIG. 2.
Figure 9:
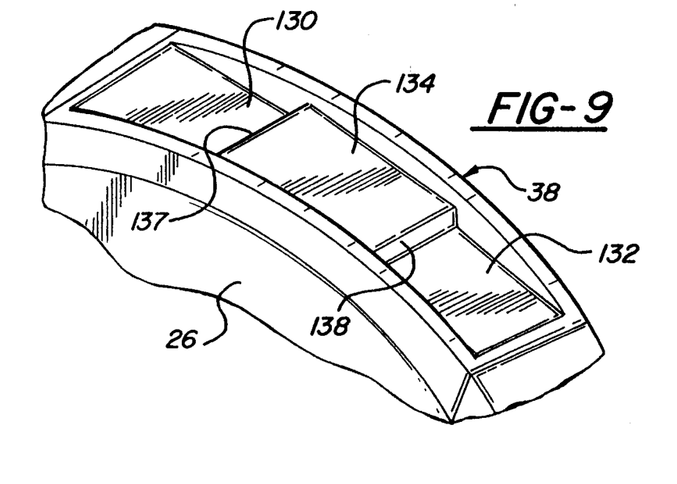
FIG. 9 is a pictorial view of a portion of one of the forming wheels of the machine of FIG. 2.

As best shown in FIG. 9, the first forming die 38 has two inclined forming surfaces 130, 132 arcuately spaced from one another which ramp inwardly from the periphery of the forming wheel to a projecting centralized rectilinear support section 134 which cooperate to shape part of the underside of the strip and the intervening pillow 168 as best shown in FIGS. 4A and 6A. The inwardly extending forming surfaces 130, 132 provide relief recesses, such as at 137, 138 at their inner ends, to accommodate offal or excess material 131, 133 of the strip when the dies 38 and 40 mate to end form the strip. With this relief, the outer or show surface 140 of the strip is uniformly contoured throughout its length until corner "C" is reached. The angled ends 64 and 66 of the strip are, accordingly, precisely formed by the surfaces 144 and 166 of the die 40.

In forming these discrete strip ends by the compression molding of the extrudate strip when fed through the forming wheels, offal 136 is formed from displaced material from the formed ends of the strip. The majority of this material is squeezed into the pillow 168 which is fed by runners 170 that flow through longitudinal openings 172 formed in the outwardly projecting pedestals 174 of the die 40.

As shown in FIGS. 4, 4A and 6A, the smooth contour of the strip is provided without any bulges or ramping along the length and, particularly, adjacent the ends 64, 66 as would be the case without provisions in the die for accommodating the excess material. Flash is squeezed out of the forming wheels and is shown at 178 along the edges of the strip.

In operation, the strip is initially fed through the forming wheels and over the idler and into the water through a trimmer and then into operative engagement with the haul-off. After this initial set-up, the foil brake on the foil supply station identified by numeral 180 is actuated to frictionally engage the foil strip fed from roll 182 through a roll system. This brake is set to provide a steady resistive load on the foil so that it is in tension from the action of the haul-off 54 pulling the strip through the reform machine, the water trough 46 and the trimming machine 48. With this resistance set, the plasticating screw 20 will pulse extrudate out of the extruding die 14 and the extruded plastic will smoothly adhere to the stabilizing strip moving at a steady rate through the die without any appreciable build-up of bulges of plastic material thereon, as would likely be the case if the strip moved at varying rates and was not maintained taut by the foil braking system.

When the strip 22 leaves the extruding die, it initially engages an arcuate portion of wheel 26 which is rotating at a predetermined speed so that the strip will be appropriately matched with the speed of the output of the extrusion die. As the strip approaches the forming sections of the two wheels, the wheel 26 provides initial cooling and "set up" of the hot extrudate so that forming of the extrudate by the mating forming surfaces of the two wheels 26 and 28 provides precise forming of the extrudate without creating any imperfections in the extrudate. As the wheels turn, the extrudate is profiled at the "apex" 24 until the forming dies 38 and 40 turn into meshing engagement at the "apex", as shown in FIG. 2. At this point, the extrudate is end formed so that a forward end of one strip and the back end of another strip are simultaneously pressure molded. In forming these front ends and back ends, the offal section 36 is created, which as pointed out removes all excess material from these ends so that the ends will be formed with precision.

After leaving the forming station, the strip is pulled around the forming wheel 28 where additional cooling is provided by the coolant flowing through the coolant passages in the wheel 28.

On leaving wheel 28, the reformed extrudate routes over the idler wheel 42 which provides additional and progressive cooling and then into the water trough 46. After being completely cooled and cleaned by the water in the trough, the strip is trimmed by the trimming wheels of the trim station 48. The strip is then fed by the haul off into the cutter station 58 at which time the cutter slices off the offal sections to complete this stage of strip production. Subsequently, adhesive strips are applied to the bottom of the strip, as is well known in this art, so that the strips can be shipped to an assembly plant where they are applied to vehicle body work or other units which require molding strips.

With this invention, the wheels 26 and 28 can be readily removed and replaced by larger or smaller diameter wheels so that the strips of different lengths can be produced. Also with this invention, the rotary reforming machine can be provided with tandem wheels to accommodate two strips of extrudate from a pair of extruders at the same time so that complete sets of molding strips for each vehicle are made at the same time on the single rotary reforming machine. This would employ a first pair of wheels as a first unit and a second pair of wheels for the mating unit and with two idlers, one for each molding strip being utilized.

The rotary reforming machine can be adjusted to various positions before the process is started to change the entry of the strip into the forming portion of the wheels. If the strip has insufficient viscosity for good profiles when using the machine position of FIGS. 1, 2 and 3, the rotary reform machine can be moved to the FIG. 11 position so that the strip enters the reform section of the two wheels immediately after leaving the extruder and without any appreciable precooling on wheel 26 before reforming and before the ends are formed. The machine is also initially adjusted in height so that the strip will be fed along a wheel tangent line and aligned with the extruder. After the initial height is set, the threaded locking screw is advanced to fix the reform machine in position.

Figure 12:
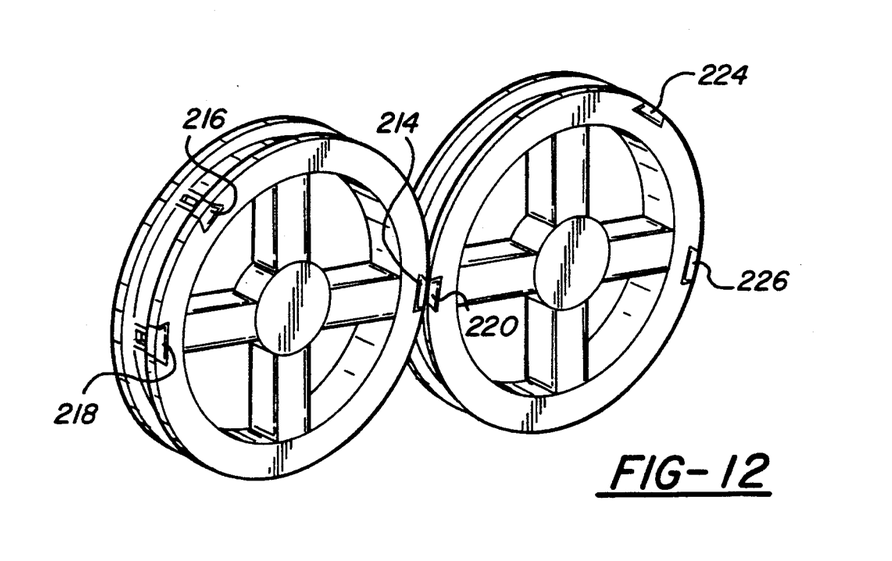
FIG. 12 is a pictorial view of an alternate pair of forming wheels usable with the rotary reforming machine of FIGS. 2 and 3.
Figure 12A:
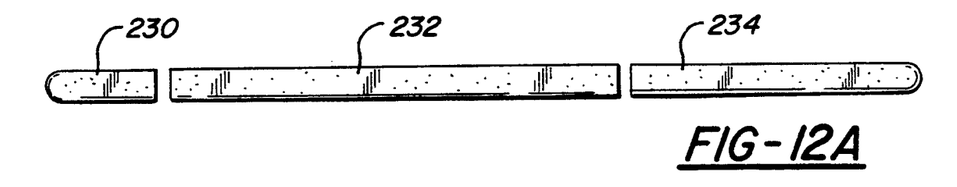
FIG. 12A is a top view of a set of three molding pieces made using rotary reforming wheels of FIG. 12 on the machine of FIGS. 2 and 3.

FIG. 12 illustrates an alternate pair of forming wheels 210, 212 which can be substituted for the wheels 26 and 28 of the first embodiment. Alternate forming wheel 210 is provided with arcuately spaced and end forming insert dies 214, 216, 218 which serially mate with insert dies 220, 222, 224 on wheel 212 to profile and end form matched sets of molding strips 230, 232 and 234. Since these strips are from the same material batch of raw material fed into the hopper of the extruder, they are accordingly uniform in color and have the same show surface and further are matched to fit on the front quarter, door and rear quarter panels of a vehicle.

Figure 13A:
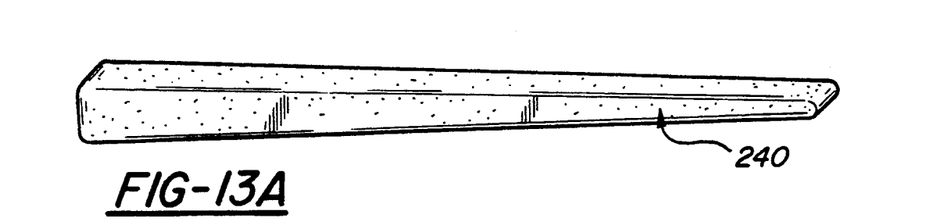
FIGS. 13A, 13B and 13C are pictorial views of molding pieces having different tapers made with other rotary reform wheels using the reform machine of this invention.
Figure 13B:
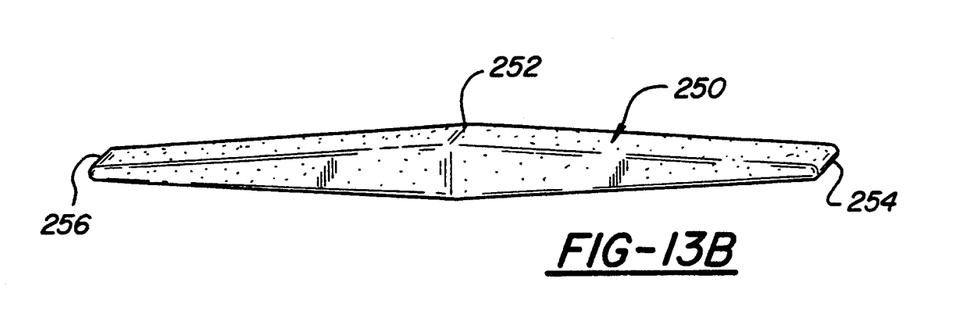
Figure 13C:
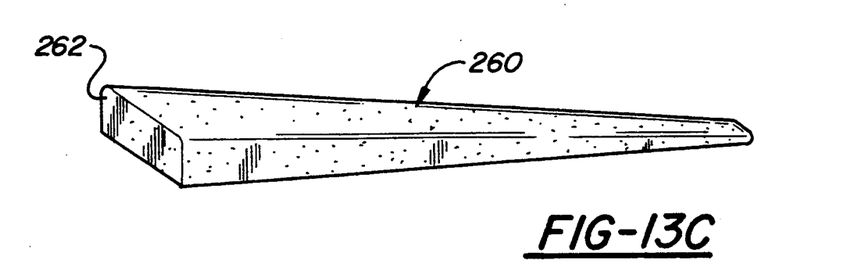

FIGS. 13A and 13B illustrate different configurations of molding strips made with different sets of profiling wheels. In FIG. 13A, the strip 240 is a single tapered strip, tapering in height from one end to the other with width remaining constant. In FIG. 13B, wheels having internal male and female forming surfaces and insert dies produce a double tapered strip 250 which tapers from a median 252 to the ends 254, 256 thereof. The strip 260 of FIG. 13C has a double taper, tapering in height and width extending from one end 262 to the other end 264.

It will be appreciated that these molding strip configurations are but a few of an infinite number of strip shapes that can be made with forming wheels with other male and female forming shapes, and end forming dies provided in the peripheral forming surfaces of the forming wheels.

While a preferred embodiment of the invention has been shown and described, other embodiments will now become apparent to those skilled in the art. Accordingly, this invention is not to be limited to that which is shown and described but by the following claims.

The embodiments of the invention in which an exclusive property or privilege is claimed are defined as follows:

1. A method for reforming a band of hot plastics extrudate formed and produced by a plastics extruder into a profiled strip of plastics with a pair of rotatable roll forming wheels normally disposed in a general side-by-side relationship relative to one another and so that they provide an extrudate profiling interface at points where said wheels are closest to one another, comprising the steps of:
  (1) activating a plastics extruder to produce a heated and formed band of plastics extrudate,
  (2) directing said formed band of extrudate over the top of a first wheel of said pair of rotatable roll forming wheel so that said first wheel provides the sole support thereof,
  (3) subsequently routing said formed band of extrudate supported on said first wheel into said profiling interface of both of said wheels,
  (4) rotatably driving said pair of roll forming wheels so that said interface profiles said extrudate as said extrudate passes therethrough to thereby reforming said extrudate into a profiled strip of plastics,
  (5) directing said profiled strip exiting said profiling interface onto a second wheel of said pair of wheels by routing said strip over a third wheel spaced from said pair of wheels, and
  (6) feeding said profiled strip from said third wheel to a station spaced therefrom.

2. The method defined in claim 1, and further including the steps of arranging said first and second wheels in a generally horizontal side-by-side relationship, aligning the top of said first wheel with said extruder so that said band of extrudate linearly feeds thereon, progressively cooling said band of extrudate by circulating coolant through said wheels as said wheels are being rotatably driven and are profiling said extrudate to resultantly form said strip and as said strip is being guided from said third wheel to said station.

3. The method of forming strips of plastics as defined in claim 1, and further including the steps of providing a discrete end forming insert die in each of said wheels, and turning said wheels so that said end forming dies synchronize with one another to end form said strip after said strip is profiled by said roll forming wheels.

4. The method defined in claim 1, and further including the steps of:
  supplying and feeding a thin ribbon of stabilizing foil from a foil supply upstream of said extruder through said plastics extruder to form a continuous core for the band of extrudate produced by said extruder, and
  applying a pulling force to said extrudate downstream of said pair of roll forming wheels while applying a resistive braking force directly to said stabilizer foil upstream of said extruder to resultantly apply a tension force to said foil so that said extrudate will be smoothly and evenly applied to said foil by said extruder.

5. A rotary form production machine for reforming the shape of a heated strip of polymer with a ribbon-like elongated reinforcement member therein produced by strip-producing extruder comprising a support a first and second forming wheels operatively mounted on said support for receiving said strip heated and profiled by said extruder, said first and second forming wheels being operatively associated with one another to provide a reforming interface therebetween to effect reprofiling of said strip, a discrete end forming die operatively mounted in each of said wheels, a first of said dies in a first of said wheels having a profiling end portion to produce a sharp end corner in said strip above said reinforcing member, a second of said dies in a second of said wheels having a recess therein below said reinforcing member and cooperating with the first of said dies to receive polymer material displaced by said profiling end portion as offal below said reinforcement member on the underside of strip, and guide wheel means spaced from and associated with said first and second forming wheels for guiding said reprofiled strip from said machine.

6. The machine defined in claim 5, wherein said first and second forming which have coolant passage means therein for the passage of cooling fluid therein to cool said strip as it is being reformed by said machine.

7. A rotary forming machine for shaping an elongated strip of heated plastics as produced by plastics strip-forming tooling comprising a support, first and second forming wheels operatively mounted on said support and spaced from one another, motor means for rotatably driving said forming wheels, said first forming wheel being operatively mounted on said support and being operable to initially receive and solely support said strip, said second forming wheel being operatively associated with said first forming wheel to provide a profiling passage between adjacent arcuate portions of said first and second forming wheels for receiving said strip to effect the reprofiling of said strip as said forming wheels are rotatably driven, and a strip guide wheel associated with said second wheel and aligned therewith for holding said strip against a portion of the periphery of said second wheel and for guiding said strip away from said second wheel, and a drive mechanism for moving said first and second wheels between a position in which said heated strip of plastics is substantially tangent to only a first of said wheels and a position where said strip is aligned with the profiling passage.

8. The machine defined in claim 7, wherein said wheels have coolant passage means therein for routing a coolant fed thereto to progressively reduce the level of heat energy in said strip as said strip is being profiled by said profiling passage of said forming wheel means.

9. The machine defined in claim 7, wherein said means for moving said machine between said positions comprises drive and driven gear members.

10. The machine defined in claim 7, wherein each wheel has removable end forming insert die means therein, and each of said wheels has separate motor means for driving said wheel means so that said insert die means mate to pressure form front and rear ends of strip as profiled by said wheel means.

11. The machine defined in claim 7, wherein said strip handling means is provided by an idler wheel, and means for mounting and supporting said idler wheel at any of a number of stations relative to said second wheel means to change the amount of arcuate contact said profiled strip has on said second wheel means.

12. A rotary reforming machine for reforming an elongated strip of heated plastics produced by plastics strip-forming tooling comprising a fixed upright, a carrier operatively mounted on said fixed upright, a support plate mounted for limited rotation relative to said fixed upright and said carrier, first and second forming wheels operatively mounted on said support plate in spaced relationship with respect to one another, motor means for rotatably driving said forming wheels, said first forming wheel having a circular periphery operative to initially receive and solely support said strip as initially produced by said strip forming tooling, said second forming wheel having a circular periphery operatively associated with said first forming wheel to provide a profiling passage between adjacent peripheral portions of said first and second forming wheels for receiving said strip and for effecting the reprofiling of said strip as said forming wheels are rotatably driven, and a strip guide wheel associated with said second forming wheel and aligned therewith for holding said strip against a portion of the periphery of said second wheel and for guiding said strip therefrom, and a drive mechanism for turning said support plate and said first and second wheels thereon between a position in which said heated strip of plastics produced by said strip forming tooling is supported by and is substantially tangent to the circular periphery of said first of said wheels and another position where said strip is aligned with the profiling passage.

13. The rotary reforming machine of claim 12, and further including an adjusting mechanism for moving said carrier and said wheels thereof to plurality of vertical positions relative to said upright.

14. The rotary reforming machine of claim 12, wherein said drive mechanism includes a motor mounted on said carrier plate, a first gear driven by said motor and a second gear secured to said support plate and driven by said motor through said first gear to thereby rotate said support plate and said forming wheels thereon.

* * * * *